United States Patent
Fukuri et al.

(10) Patent No.: US 12,404,409 B2
(45) Date of Patent: Sep. 2, 2025

(54) ASPHALT COMPOSITION

(71) Applicant: KAO CORPORATION, Tokyo (JP)

(72) Inventors: Norihiro Fukuri, Tokyo (JP); Hiroki Kakiuchi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 423 days.

(21) Appl. No.: 17/908,929

(22) PCT Filed: Mar. 5, 2021

(86) PCT No.: PCT/JP2021/008697
§ 371 (c)(1),
(2) Date: Sep. 2, 2022

(87) PCT Pub. No.: WO2021/177444
PCT Pub. Date: Sep. 10, 2021

(65) Prior Publication Data
US 2023/0091707 A1 Mar. 23, 2023

(30) Foreign Application Priority Data
Mar. 6, 2020 (JP) .................................. 2020-039313

(51) Int. Cl.
*C08L 95/00* (2006.01)
(52) U.S. Cl.
CPC .................................. *C08L 95/00* (2013.01)
(58) Field of Classification Search
CPC ...................................................... C08L 95/00
See application file for complete search history.

(56) References Cited

U.S. PATENT DOCUMENTS 5,558,703 A * 9/1996 Bredael .................. E01C 7/265
106/284.01
2012/0220676 A1 8/2012 Moens

FOREIGN PATENT DOCUMENTS

| CN | 102181134 A | 9/2011 |
|---|---|---|
| CN | 103509356 A | 1/2014 |
| JP | 2003138430 A | 5/2003 |
| JP | 2004163808 A | 6/2004 |
| JP | 2006096799 A | 4/2006 |
| JP | 2013510917 A | 3/2013 |
| JP | 2020200459 A | 12/2020 |
| WO | WO-2009004745 A1 | 1/2009 |
| WO | WO-2017033682 A1 | 3/2017 |
| WO | WO-2017077748 | 5/2017 |
| WO | WO-2019017334 A1 | 1/2019 |
| WO | WO-2019100058 A1 | 5/2019 |

OTHER PUBLICATIONS

English Translation of JP 2004163808 (Year: 2004).*
Extended European Search Report issued Feb. 16, 2024 in corresponding European Patent Application No. 21763542.4, 6 pages.
International Search Report issued Apr. 20, 2021 in PCT/JP2021/008697 (with English translation), 10 pages.

* cited by examiner

*Primary Examiner* — Catherine S Branch
*Assistant Examiner* — Andrea Wu
(74) *Attorney, Agent, or Firm* — Element IP, PLC

(57) ABSTRACT

The present invention provides an asphalt composition containing an asphalt and a polyester, the polyester being a polycondensate of a polyethylene terephthalate, an alcohol, and a carboxylic acid compound, the polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less.

11 Claims, No Drawings

ASPHALT COMPOSITION

FIELD OF THE INVENTION

The present invention relates to an asphalt composition, an asphalt mixture, and methods of producing the same.

BACKGROUND OF THE INVENTION

Asphalt pavement using an asphalt composition has been frequently performed for paving driveways, parking spaces, cargo yards, sidewalks, etc., because of relatively easy construction and a short period of time from beginning of paving works to traffic start. In such asphalt pavement, a road surface is formed of an asphalt mixture containing aggregates bonded with each other through asphalt, and hence, the paved roads exhibit good hardness and durability.

For example, PTL 1 (JP 2006-096799 A) discloses, for the purpose of providing a high-value plastic composition having desired characteristics for a pavement material in which waste PET can be treated in a large amount at as low a cost as possible, a method of producing a plastic composition for a pavement material in which waste PET and one or two or more polyhydric alcohols and/or a saccharide are subjected to transesterification in the presence of a catalyst to obtain a plastic composition for a pavement material.

SUMMARY OF THE INVENTION

The present invention relates to an asphalt composition containing an asphalt and a polyester, the polyester being a polycondensate of a polyethylene terephthalate, an alcohol, and a carboxylic acid compound, the polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less.

DETAILED DESCRIPTION OF THE INVENTION

Since an asphalt-paved surface deteriorates through long-term use and thus a rut of wheels or a crack is generated thereon, repair of the pavement is inevitably needed. Furthermore, the road surface is scraped to generate abrasion dust of asphalt, resulting in generation of microplastics.

The present invention relates to an asphalt composition that can reduce the amount of microplastics generated, an asphalt mixture, and methods of producing the same.

The present invention relates to the following [1] to [5].
[1] An asphalt composition containing an asphalt and a polyester,
  the polyester being a polycondensate of a polyethylene terephthalate, an alcohol, and a carboxylic acid compound,
  the polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less.
[2] A method of producing an asphalt composition, the method including
  Step 1: a step of subjecting a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less to transesterification in the presence of an alcohol and a carboxylic acid compound for 4 hours or more under a condition of 180° C. or higher and 235° C. or lower to obtain a polyester, and
  Step 2: a step of mixing an asphalt with the polyester obtained in the Step 1.
[3] An asphalt mixture containing the asphalt composition according to the above [1] and an aggregate.
[4] A method of producing an asphalt mixture, the method including
  Step 1: a step of subjecting a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less to transesterification in the presence of an alcohol and a carboxylic acid compound for 4 hours or more under a condition of 180° C. or higher and 235° C. or lower to obtain a polyester, and
  Step 2: a step of mixing a heated aggregate, an asphalt, and the polyester obtained in the Step 1.
[5] A method of producing a polyester, the method including subjecting a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less to transesterification in the presence of an alcohol and a carboxylic acid compound for 4 hours or more under a condition of 180° C. or higher and 235° C. or lower.

According to the present invention, it is possible to provide an asphalt composition that can reduce the amount of microplastics generated, an asphalt mixture, and methods of producing the same.

[Asphalt Composition]

The asphalt composition of the present invention (hereinafter also referred to simply as "the asphalt composition") contains an asphalt and a polyester.

The polyester is a polycondensate of a polyethylene terephthalate, an alcohol, and a carboxylic acid compound, and the polyethylene terephthalate has a value of [(a quantity of heat absorbed in a DSC measurement)−(a quantity of heat generated in a DSC measurement)] of 5 J/g or more and 30 J/g or less and has an intrinsic viscosity (IV) of 0.6 or more and 1.05 or less.

According to the above configuration, an asphalt composition that can reduce the amount of microplastics generated can be obtained. Furthermore, by applying this technology, an asphalt mixture and a method for producing an asphalt mixture can be provided.

The reason why the effect of the present invention can be achieved is not clear, but is supposed as follows.

When a polyethylene terephthalate (hereinafter also referred to as "PET") is added into an asphalt as it is without any processing, since the melting point of the PET is a relatively high temperature of 260° C., the PET is present in paving as masses that remain to have original particle diameters thereof, which does not lead to enhancement in bonding strength between aggregates by the asphalt.

In contrast, the polyester used in the present invention is a polycondensate of a PET, an alcohol, and a carboxylic acid compound, and a transesterification reaction occurs by subjecting a PET to polycondensation with an alcohol component and a carboxylic acid component. In addition, a structural unit of PET is incorporated into an alcohol component-derived structural unit and a carboxylic acid component-derived structural unit in the polyester. The value of [(a quantity of heat absorbed in a DSC measurement)−(a quantity of heat generated in a DSC measurement)] of the PET is 5 J/g or more and 30 J/g or less and the intrinsic viscosity (IV) of the PET is 0.6 or more and 1.05 or less. In the case of a PET having a prescribed quantity of heat, in a transesterification reaction, the transesterification reaction is promoted due to easy melting of the PET, leading to uniform incorporation of the PET into the polyester. Furthermore, when the PET has an IV of 0.6 or more and 1.05 or less, in a transesterification reaction, the PET is incorporated into the polyester with the PET unit retained. As a result, a state similar to a block copolymer is formed and a high polarity is uniformly retained.

Asphalt contains a hydrophilic asphaltene component having adsorption property to aggregates and a hydrophobic maltene component not having adsorption property to aggregates. A highly polar PET moiety uniformly introduced in the polyester used in the present invention effectively interacts with the maltene component to form a composite, and the composite more enhances the bonding between aggregates, making it possible to reduce the amount of microplastics generated. Here, according to the findings by the present inventors, when the quantity of heat of the PET is 5 J/g or more, the amorphous moiety of PET is present in an appropriate amount and depolymerization of the PET into monomer units in the transesterification reaction is suppressed. Thus, the PET moiety which interacts with maltene is introduced in an appropriate amount to easily form the composite. When the quantity of heat of the PET is 30 J/g or less, the crystalline moiety of the PET is present in an appropriate amount and the PET moiety is uniformly introduced to easily form the composite. When the IV of the PET is 0.6 or more, depolymerization of the PET into monomer units in the transesterification reaction is suppressed, and thus the moiety which interacts with maltene is introduced in an appropriate amount to easily form the composite. When the IV of the PET is 1.05 or less, the PET moiety is uniformly introduced to easily form the composite.

Definitions and so on regarding various terminologies in this specification are hereunder described.

A "binder mixture" means a mixture containing an asphalt and a thermoplastic elastomer, and, for example, it has a concept including an asphalt modified with a thermoplastic elastomer as mentioned later (hereinafter also referred to as "modified asphalt").

In the polyester, an "alcohol component-derived structural unit" means a structure resulting from eliminating a hydrogen atom from a hydroxy group of the alcohol component, and a "carboxylic acid component-derived structural unit" means a structure resulting from eliminating a hydroxy group from a carboxy group of the carboxylic acid component.

A "carboxylic acid compound" has a concept including not only a carboxylic acid but also an anhydride thereof which is decomposed during a reaction to form an acid and a carboxylic acid alkyl ester (for example, the number of carbon atoms of the alkyl group is 1 or more and 3 or less). In the case where a carboxylic acid compound is a carboxylic acid alkyl ester, the number of carbon atoms of the alkyl group that is an alcohol residue of the ester is not added in the number of carbon atoms of the carboxylic acid compound.

[Asphalt]

The asphalt composition of the present invention contains an asphalt.

As the asphalt, various asphalts can be used. For example, besides straight asphalt which is petroleum asphalt for pavement, a modified asphalt is exemplified. Examples of the modified asphalt include blown asphalt; and an asphalt modified with a polymer material, such as a thermoplastic elastomer or a thermoplastic resin. Straight asphalt means a residual bituminous substance obtained by treating crude petroleum with an atmospheric distillation apparatus, a vacuum distillation apparatus, or the like. Blown asphalt means an asphalt obtained by heating a mixture of straight asphalt and heavy oil, then blowing the air into the mixture to oxidize them. From the viewpoint of reducing the amount of microplastics generated, a modified asphalt is preferred.

In this description, "asphalt" includes bitumen defined in the German industry standard DIN EN 12597. "Asphalt" and "bitumen" can be interchangeably used.

[Thermoplastic Elastomer]

From the viewpoint of the reduction in the amount of microplastics, the asphalt composition preferably contains a thermoplastic elastomer. The asphalt and the thermoplastic elastomer are preferably used as a binder mixture which is a mixture thereof. An example of the binder mixture is a straight asphalt modified with a thermoplastic elastomer (modified asphalt).

As the thermoplastic elastomer, for example, at least one selected from the group consisting of a styrene/butadiene block copolymer (hereinafter also referred to simply as "SB"), a styrene/butadiene/styrene block copolymer (hereinafter also referred to simply as "SBS"), a styrene/butadiene random copolymer (hereinafter also referred to simply as "SBR"), a styrene/isoprene block copolymer (hereinafter also referred to simply as "SI"), a styrene/isoprene/styrene block copolymer (hereinafter also referred to simply as "SIS"), a styrene/isoprene random copolymer (hereinafter also referred to simply as "SIR"), an ethylene/vinyl acetate copolymer, and an ethylene/acrylic acid ester copolymer is exemplified.

An example of a commercially available product of the ethylene/acrylic acid ester copolymer is "Elvaroy" (manufactured by DuPont de Nemours, Inc.).

Among the thermoplastic elastomers, from the viewpoint of reducing the amount of microplastics generated, at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer is preferred; and at least one selected from the group consisting of a styrene/butadiene random copolymer and a styrene/butadiene block copolymer is more preferred.

From the viewpoint of reducing the amount of microplastics generated, the content of the thermoplastic elastomer in the asphalt composition is preferably 0.1% by mass or more, more preferably 0.5% by mass or more, further preferably 1% by mass or more, furthermore preferably 2% by mass or more, and preferably 30% by mass or less, more preferably 20% by mass or less, further preferably 10% by mass or less, furthermore preferably 5% by mass or less, in 100% by mass of the asphalt composition.

From the viewpoint of reducing the amount of microplastics generated, the content of the thermoplastic elastomer in the asphalt composition is preferably 0.1% by mass or more, more preferably 0.5% by mass or more, further preferably 1% by mass or more, furthermore preferably 2% by mass or more, and preferably 30% by mass or less, more preferably 20% by mass or less, further preferably 10% by mass or less, furthermore preferably 5% by mass or less, relative to 100% by mass of the asphalt.

The content of the asphalt in the asphalt composition is, from the viewpoint of reducing the amount of microplastics and the viewpoint of exhibiting the asphalt performance, preferably 60% by mass or more, more preferably 70% by mass or more, further preferably 75% by mass or more, furthermore preferably 80% by mass or more, and from the viewpoint of reducing the amount of microplastics, preferably 98% by mass or less, more preferably 97% by mass or less, further preferably 96% by mass or less.

[Polyester]

The asphalt composition of the present invention contains a polyester. From the viewpoint of reducing the amount of microplastics generated, the polyester is a polycondensate of a polyethylene terephthalate, an alcohol, and a carboxylic acid compound. From the viewpoint of reducing the amount of microplastics generated, the value of [(a quantity of heat absorbed in a DSC measurement)–(a quantity of heat generated in a DSC measurement)] of the polyethylene terephthalate is 5 J/g or more and 30 J/g or less and the intrinsic viscosity (IV) of the polyethylene terephthalate is 0.6 or more and 1.05 or less.

<Alcohol Component>

Examples of the alcohol component include an aliphatic diol, an aromatic diol, and a trihydric or higher polyhydric alcohol. One of the alcohol components can be used alone or two or more thereof can be used in combination.

The aliphatic diol is preferably a linear or branched aliphatic diol having 2 or more and 12 or less carbon atoms, more preferably a linear or branched aliphatic diol having 2 or more and 4 or less carbon atoms. Specific examples of the aliphatic diol include ethylene glycol, 1,2-propanediol, 1,3-propanediol, 1,3-butanediol, 1,4-butanediol, 1,4-butenediol, 1,5-pentanediol, 1,6-hexanediol, neopentyl glycol, 1,10-decanediol, and 1,12-dodecanediol.

An example of the aromatic diol is an alkylene oxide adduct of bisphenol A. An example of the alkylene oxide adduct of bisphenol A is an alkylene oxide adduct of bisphenol A represented by the following formula (I).

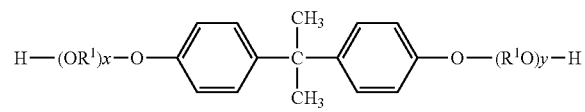

(I)

[In the formula, $OR^1$ and $R^1O$ is an alkylene oxide, $R^1$ is an alkylene group having 2 or 3 carbon atoms, x and y represent a positive number indicating the average number of moles of the alkylene oxide added, the sum of x and y is preferably 1 or more, more preferably 1.5 or more, and preferably 16 or less, more preferably 8 or less, further preferably 4 or less.]

Examples of the alkylene oxide adduct of bisphenol A represented by the formula (I) include a propylene oxide adduct of bisphenol A [2,2-bis(4-hydroxyphenyl)propane] and an ethylene oxide adduct of bisphenol A. One of the alkylene oxide adducts of bisphenol A can be used alone or two or more thereof can be used in combination.

Examples of the trihydric or higher polyhydric alcohol include glycerol, pentaerythritol, trimethylolpropane, and sorbitol.

From the viewpoint of reducing the amount of microplastics generated, the alcohol component is preferably an aliphatic diol. From the viewpoint of reducing the amount of microplastics generated, the content of the aliphatic diol is preferably 80% by mole or more, more preferably 90% by mole or more, and is 100% by mole or less, in 100% by mole of the alcohol component in the polyester.

<Carboxylic Acid Component>

Examples of the carboxylic acid component include an aliphatic dicarboxylic acid compound, an aromatic dicarboxylic acid compound, and a tribasic or higher and hexabasic or lower polybasic carboxylic acid compound. One of the carboxylic acid components can be used alone or two or more thereof can be used in combination.

From the viewpoint of reducing the amount of microplastics generated, the number of carbon atoms in the main chain of the aliphatic dicarboxylic acid is preferably 3 or more, more preferably 4 or more, and preferably 10 or less, more preferably 8 or less.

Examples of the aliphatic dicarboxylic acid compound include fumaric acid, maleic acid, oxalic acid, malonic acid, citraconic acid, itaconic acid, glutaconic acid, succinic acid, adipic acid, suberic acid, azelaic acid, sebacic acid, dodecanedioic acid, and a succinic acid substituted with an alkyl group having 1 or more and 20 or less carbon atoms or an alkenyl group having 2 or more and 20 or less carbon atoms, and anhydrides or alkyl esters (for example, the number of carbon atoms of the alkyl group is 1 or more and 3 or less) thereof. Examples of the substituted succinic acid include dodecylsuccinic acid, dodecenylsuccinic acid, and octenylsuccinic acid. Among the above aliphatic dicarboxylic acid compounds, at least one selected from the group consisting of fumaric acid, maleic acid, and adipic acid is preferred, and adipic acid is more preferred.

Examples of the aromatic dicarboxylic acid compound include phthalic acid, terephthalic acid, isophthalic acid, and naphthalenedicarboxylic acid, and anhydrides or alkyl esters (for example, the number of carbon atoms of the alkyl group is 1 or more and 3 or less) thereof. Among the aromatic dicarboxylic acid compounds, from the viewpoint of reducing the amount of microplastics generated, isophthalic acid and terephthalic acid are preferred, and terephthalic acid is more preferred.

The tribasic or higher and hexabasic or lower carboxylic acid is preferably a tribasic carboxylic acid. Examples of the tribasic or higher and hexabasic or lower carboxylic acid include trimellitic acid, 2,5,7-naphthalenetricarboxylic acid, pyromellitic acid, and acid anhydrides thereof. When a polyvalent carboxylic acid is contained, from the viewpoint of controlling properties, a monohydric alcohol may be appropriately contained in the alcohol component, and a monobasic carboxylic acid compound may be appropriately contained in the carboxylic acid component.

When the carboxylic acid component contains an aliphatic dicarboxylic acid compound, from the viewpoints of increasing the flexibility of the polyester to reduce the amount of microplastics generated, the content of the aliphatic dicarboxylic acid compound in the carboxylic acid component is preferably 1% by mole or more, more preferably 5% by mole or more, further preferably 10% by mole or more, and preferably 40% by mole or less, more preferably 30% by mole or less, in 100% by mole of the carboxylic acid component.

From the viewpoints of enhancing the melt-dispersibility in an asphalt and reducing the amount of microplastics generated, the content of the aromatic dicarboxylic acid compound is preferably 60% by mole or more, more preferably 70% by mole or more, and preferably 100% by mole or less, more preferably 99% by mole or less, further preferably 95% by mole or less, furthermore preferably 90% by mole or less, in 100% by mole of the carboxylic acid component.
(Molar Ratio of Carboxylic Acid Component-Derived Structural Unit to Alcohol Component-Derived Structural Unit)

From the viewpoint of controlling the acid value and reducing the amount of microplastics generated, a molar ratio of the carboxylic acid component-derived structural unit to the alcohol component-derived structural unit [(carboxylic acid component)/(alcohol component)] is preferably 0.7 or more, and more preferably 0.8 or more, further preferably 0.9 or more, and preferably 1.5 or less, more preferably 1.3 or less, further preferably 1.1 or less.
(Polyethylene Terephthalate-Derived Structural Unit)

The polyester used in the present invention contains a structural unit composed of ethylene glycol and terephthalic acid derived from a polyethylene terephthalate. The polyethylene terephthalate may contain, besides the structural unit composed of ethylene glycol and terephthalic acid, a small amount of butanediol, isophthalic acid, or other components. The polyethylene terephthalate is preferably a recovered polyethylene terephthalate.

In recent years, an influence of waste plastics on the environment has become a problem, and recycling of the waste plastics has been considered. Since polyethylene terephthalate is widely used as a product, such as a bottle or a film, a polyethylene terephthalate that is produced as a product and then discarded and recovered (hereinafter referred to as "recovered PET") is preferably used in the present invention in terms of the environmental issue and the cost. The type and the like of the recovered polyethylene terephthalate is not particularly limited as long as it has a certain level of purity. The recovered polyethylene terephthalate may contain a small amount of a plastic, such as polyethylene or polypropylene, as an impurity. For example, a waste pouch container can be used as the recovered PET. When the recovered PET contains polyethylene and/or polypropylene, the total content of the polyethylene and polypropylene is preferably 5% by mass or less, more preferably 3% by mass or less. The lower limit is not particularly limited, and, for example, may be 0.1% by mass or more, or may be 0.05% by mass or more.

In use of the recovered product, due to the handling and the easiness of dispersion, decomposition, and the like, pulverized flakes, pellets, or the like are suitably used. The specific size of the recovered product used in the present invention is, from the viewpoint of the reaction efficiency, preferably about 4 to 15 mm$^2$ and the thickness thereof is preferably about 3 mm or less.

From the viewpoint of reducing the amount of microplastics generated, the intrinsic viscosity (IV) of PET is 0.6 or more, and 1.05 or less, preferably 1.04 or less, more preferably 1.03 or less. When the intrinsic viscosity of PET is 0.6 or more and 1.05 or less, the amount of microplastics generated can be sufficiently reduced.

The intrinsic viscosity (IV) is measured according to a method described in Example. The intrinsic viscosity (IV) of PET is preferably more than 0.6, more preferably 0.61 or more, further preferably 0.62 or more, further preferably 0.63 or more, further preferably 0.64 or more. The intrinsic viscosity (IV) of PET may be, for example, 0.7 or more, 0.80 or more, or 0.90 or more.

From the viewpoint of reducing the amount of microplastics generated, the value of [(a quantity of heat absorbed in a DSC measurement)−(a quantity of heat generated in a DSC measurement)] of PET is 5 J/g or more, preferably 10 J/g or more, more preferably 12 J/g or more, and 30 J/g or less, preferably 29 J/g or less. The value may be, for example, 5.0 J/g or more, 10.0 J/g or more, or 12.0 J/g or more, and 30.0 J/g or less, 29.5 J/g or less, or 29.0 J/g or less.

The quantity of heat absorbed and the quantity of heat generated in a DSC measurement of PET are measured according to a method described in Examples.

The polyester used in the present invention may be a polyester modified to the extent that the characteristics are not substantially impaired. A specific example of the modified polyester is a polyester obtained by grafting or blocking a polyester with phenol, urethane, epoxy, or the like by a method described in JP 11-133668 A, JP 10-239903 A, JP 8-20636 A, or the like. A preferred example of the modified polyester is a urethane-modified polyester obtained by subjecting a polyester to urethane-extension with a polyisocyanate compound.
(Properties of Polyester)

From the viewpoint of reducing the amount of microplastics generated, the softening point of the polyester is preferably 90° C. or higher, more preferably 95° C. or higher, further preferably 98° C. or higher, and preferably 140° C. or lower, more preferably 130° C. or lower, further preferably 125° C. or lower, furthermore preferably 120° C. or lower, furthermore preferably 115° C. or lower.

The acid value of the polyester is, from the viewpoint of promoting adsorption to the aggregate to reduce the amount of microplastics generated, preferably 2 mgKOH/g or more, more preferably 5 mgKOH/g or more, further preferably 10 mgKOH/g or more, and from the viewpoint of increasing water resistance of the paved surface, is preferably 40 mgKOH/g or less, more preferably 30 mgKOH/g or less, further preferably 20 mgKOH/g or less.

From the viewpoint of reducing the amount of microplastics generated, the hydroxyl value of the polyester is preferably 1 mgKOH/g or more, more preferably 5 mgKOH/g or more, further preferably 10 mgKOH/g or more, furthermore preferably 15 mgKOH/g or more, and preferably 70 mgKOH/g or less, more preferably 50 mgKOH/g or less, further preferably 30 mgKOH/g or less, furthermore preferably 26 mgKOH/g or less.

From the viewpoint of reducing the amount of microplastics generated, the glass transition point of the polyester is preferably 30° C. or higher, more preferably 40° C. or higher, further preferably 50° C. or higher, and preferably 80° C. or lower, more preferably 70° C. or lower, further preferably 65° C. or lower.

From the viewpoint of reducing the amount of microplastics generated, the number average molecular weight (Mn) of the polyester is preferably 1,600 or more, more preferably 2,000 or more, further preferably 2,500 or more, and preferably 5,000 or less, more preferably 4,500 or less, further preferably 4,000 or less.

From the viewpoint of reducing the amount of microplastics generated, the weight average molecular weight (Mw) of the polyester is preferably 5,000 or more, more preferably 6,000 or more, further preferably 7,000 or more, and preferably 30,000 or less, more preferably 20,000 or less, further preferably 15,000 or less.

From the viewpoint of reducing the amount of microplastics generated, the content of components having a molecular weight of 500 or less in a molecular weight distribution measured by gel permeation chromatography in the polyester is preferably 7.0% by mass or less, more preferably 5.5% by mass or less, further preferably 5.0% by mass or less. The lower limit is not particularly limited, but may be, for example, 2.0% by mass.

The softening point, the acid value, the hydroxyl value, the glass transition point, the number average molecular weight (Mn), the weight average molecular weight (Mw), and the content of components having a molecular weight of 500 or less in the polyester can be measured according to methods described in Examples. The softening point, the acid value, the hydroxyl value, the glass transition point, the number average molecular weight (Mn), the weight average molecular weight (Mw), and the content of components having a molecular weight of 500 or less in the polyester can be adjusted by the raw material monomer composition, the molecular weight, the amount of a catalyst, or reaction conditions.

(Method of Producing Polyester)

A method of producing the polyester is not particularly limited, and, for example, the polyester can be produced by subjecting a polyethylene terephthalate, an alcohol component, and a carboxylic acid component to polycondensation. The temperature in the polycondensation reaction is not particularly limited, but from the viewpoint of the reactivity and the viewpoint of the monomer decomposition temperature, is preferably 180° C. or higher and 235° C. or lower° C. . . . It is also preferred that the temperature in the polycondensation reaction is 180° C. or higher and 210° C. or lower.

As a method of producing the polyester, a method in which a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less is subjected to transesterification in the presence of an alcohol and a carboxylic acid compound for 4 hours or more under a condition of 180° C. or higher and 235° C. or lower is preferred. It is also preferred that the temperature in transesterification is 180° C. or higher and 210° C. or lower.

From the viewpoint of reducing the amount of microplastics generated, the amount of the polyethylene terephthalate present in the raw materials is preferably 5% by mass or more, more preferably 10% by mass or more, further preferably 15% by mass or more, and preferably 80% by mass or less, more preferably 70% by mass or less, further preferably 60% by mass or less, in 100% by mass of the total amount of the polyethylene terephthalate, the alcohol component, and the carboxylic acid component.

By adding a polyethylene terephthalate in a polycondensation reaction of an alcohol component and a carboxylic acid component, a transesterification reaction occurs, and a polyester having a structural unit of polyethylene terephthalate incorporated in an alcohol component-derived structural unit and a carboxylic acid-derived structural unit can be obtained.

The polyethylene terephthalate may be present at the beginning of the polycondensation reaction or may be added to the reaction system during the polycondensation reaction. From the viewpoint of the reduction in the amount of microplastics, the timing of addition of the polyethylene terephthalate is preferably a stage in which the reaction rate of the alcohol component and the carboxylic acid component is 10% or less, and more preferably a stage in which the reaction rate is 5% or less. Note that the reaction rate refers to a value of [amount of reaction water generated (mol)/theoretical amount of water generated (mol)×100].

From the viewpoint of the reactivity and the cost, a tin(II) compound having no Sn—C bond, such as tin(II) di(2-ethylhexanoate), can be used as an esterification catalyst in the polycondensation reaction. The amount of the esterification catalyst used is preferably 0.01 parts by mass or more, more preferably 0.2 parts by mass or more, and preferably 3.0 parts by mass or less, more preferably 1.5 parts by mass or less, relative to 100 parts by mass of the total amount of the alcohol component, the carboxylic acid component, and the polyethylene terephthalate.

From the viewpoint of the reactivity and the cost, in addition to the catalyst, a pyrogallol compound, such as gallic acid, can be used as an esterification promoter in the polycondensation reaction. The amount of the esterification promoter used is preferably 0.001 parts by mass or more, more preferably 0.005 parts by mass or more, further preferably 0.01 parts by mass or more, and preferably 0.50 parts by mass or less, more preferably 0.20 parts by mass or less, further preferably 0.10 parts by mass or less, relative to 100 parts by mass of the total amount of the alcohol component, the carboxylic acid component, and the polyethylene terephthalate.

(Content of Polyester)

In the asphalt composition of the present invention, from the viewpoint of reducing the amount of microplastics generated, the content of the polyester relative to 100 parts by mass of the asphalt is preferably 0.5 parts by mass or more, more preferably 1 parts by mass or more, further preferably 3 parts by mass or more, furthermore preferably 5 parts by mass or more, and preferably 50 parts by mass or less, more preferably 30 parts by mass or less, further preferably 20 parts by mass or less, furthermore preferably 10 parts by mass or less.

[Method of Producing Asphalt Composition]

The method of producing an asphalt composition of the present invention preferably includes a step of mixing an asphalt with the polyester described above.

An asphalt composition is obtained by melting an asphalt with heat, adding the polyester thereto, and mixing the mixture by stirring with a generally used mixer until the components are uniformly dispersed. Examples of the generally used mixer include a homomixer, a dissolver, a paddle mixer, a ribbon mixer, a screw mixer, a planetary mixer, a vacuum reverse-flow mixer, a roll mill, and a twin screw extruder.

From the viewpoint of uniformly dispersing the polyester in the asphalt and the viewpoints of the reduction in the amount of microplastics and the storage stability, the temperature in mixing the asphalt and the polyester is preferably 100° C. or higher, more preferably 130° C. or higher, further preferably 160° C. or higher, furthermore preferably 170° C. or higher, and preferably 230° C. or lower, more preferably 210° C. or lower, further preferably 200° C. or lower, furthermore preferably 190° C. or lower.

From the viewpoint of efficiently uniformly dispersing the polyester in the asphalt, the time of mixing the asphalt and the polyester is preferably 0.1 hours or more, more preferably 0.5 hours or more, further preferably 1.0 hour or more, furthermore preferably 1.5 hours or more, and preferably 10 hours or less, more preferably 7 hours or less, further preferably 5 hours or less, furthermore preferably 3 hours or less.

A preferred aspect of the method of producing an asphalt composition includes a step of subjecting a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less to transesterification in the presence of an alcohol and a carboxylic acid compound for 4 hours or more under a condition of 180° C. or higher and 235° C. or lower to obtain a polyester (Step 1) and a step of mixing an asphalt with the polyester (the polyester obtained in Step 1) (Step 2). It is also preferred that the temperature in transesterification is 180° C. or higher and 210° C. or lower.

The polyethylene terephthalate is preferably a recovered polyethylene terephthalate. In this case, the method of producing an asphalt composition preferably includes a step of recovering a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less from a product (Step 1a), a step of subjecting the polyethylene terephthalate (the polyethylene terephthalate obtained in the Step 1a) to transesterification in the presence of an alcohol and a carboxylic acid compound for 4 hours or more under a condition of 180° C. or higher and 235° C. or lower to obtain a polyester (Step 2a), and a step of mixing an asphalt with the polyester (the polyester obtained in the Step 2a) (Step 3a). It is also preferred that the temperature in transesterification is 180° C. or higher and 210° C. or lower.

[Dispersant]

The asphalt composition may contain a dispersant.

The dispersant is preferably a dispersant soluble in an asphalt and having affinity with a polyester.

Examples of the dispersant include a polymer dispersant and a surfactant, such as a polyoxyethylene alkylamine and an alkanolamine.

Examples of the polymer dispersant include a polyamide amine and a salt thereof, a polycarboxylic acid and a salt thereof, a high-molecular weight unsaturated acid ester, a modified polyurethane, a modified polyester, a modified poly(meth)acrylate, a (meth)acrylic copolymer, and a naphthalenesulfonic acid formalin condensate. These dispersants may be used alone or in combination of two or more thereof.

From the viewpoint of enhancing the high-temperature storage stability, the dispersant is preferably a polymer dispersant. The "polymer dispersant", as used in the present invention, means a dispersant having a weight average molecular weight of 1,000 or more. Although the weight average molecular weight also depends on the polymer species, it is preferably 2,000 or more, more preferably 4,000 or more, and preferably 80,000 or less, more preferably 40,000 or less.

The dispersant preferably has a basic functional group. The basic functional group means a group such that a pKa of the conjugate acid is −3 or more. Examples of the basic functional group include an amino group, an imino group, and a quaternary ammonium group From the viewpoint of the high temperature storage stability, the base value of the dispersant is preferably 10 mgKOH/g or more, more preferably 20 mgKOH/g or more, further preferably 30 mgKOH/g or more, and preferably 150 mgKOH/g or less, more preferably 120 mgKOH/g or less, further preferably 100 mgKOH/g or less. The base value is measured by the method prescribed in JIS K7237:1995.

Examples of a commercially available dispersant include "DISPER" Series "byk-101", "byk-130", "byk-161", "byk-162", "byk-170", "byk-2020", "byk-2164", and "byk-LPN21324" (all of which are manufactured by BYK Additives & Instruments; "SOLSPERSE" Series "9000", "11200", "13240", "13650", "13940", "17000", "18000", "24000", "28000", "32000", "38500", and "71000" (all of which are manufactured by Lubrizol Corp.); "AJISPER" Series "PB821", "PB822", "PB880", and "PB881" (all of which are manufactured by Ajinomoto Fine-Techno Co., Inc.); "EFKA" Series "46", "47", "48", "49", "4010", "4047", "4050", "4165", and "5010" (all of which are manufactured by BASF SE); "FLOWLEN TG-710" (manufactured by Kyoeisha Chemical Co., Ltd.); and "TAMN-15" (manufactured by Nikko Chemicals Co., Ltd.).

From the viewpoint of the high temperature storage stability, the content of the dispersant is preferably 1 part by mass or more, more preferably 3 parts by mass or more, further preferably 4 parts by mass or more, and preferably 80 parts by mass or less, more preferably 60 parts by mass or less, further preferably 40 parts by mass or less, furthermore preferably 30 parts by mass or less, furthermore preferably 20 parts by mass or less, relative to 100 parts by mass of the polyester.

[Asphalt Mixture]

The asphalt composition of the present invention is a binder composition, and is used for pavement after an aggregate is added to the asphalt composition to prepare an asphalt mixture. In other word, the asphalt composition of the present invention is suitable for pavement, in particular, for pavement of a road.

The asphalt mixture of the present invention contains the asphalt composition described above and an aggregate. That is, the asphalt mixture contains an asphalt, a polyester, and an aggregate, and preferably contains an asphalt, a thermoplastic elastomer, a polyester, and an aggregate.

From the viewpoint of reducing the amount of microplastics generated, the content of the asphalt composition in the asphalt mixture is preferably 2% by mass or more, more preferably 3% by mass or more, further preferably 4% by mass or more, and preferably 15% by mass or less, more preferably 10% by mass or less, further preferably 8% by mass or less, in 100% by mass of the asphalt mixture.

(Aggregate)

As the aggregate, for example, any of crushed stones, cobble stones, gravel, sand, recycled aggregate, ceramic, and the like can be selected and used. As the aggregate, any of a coarse aggregate having a particle diameter of 2.36 mm or more and a fine aggregate having a particle diameter of less than 2.36 mm can be used.

Examples of the coarse aggregate include crushed stones having a particle diameter range of 2.36 mm or more and 4.75 mm or less, crushed stones having a particle diameter range of 4.75 mm or more and 12.5 mm or less, crushed stones having a particle diameter range of 12.5 mm or more and 19 mm or less, and crushed stones having a particle diameter range of 19 mm or more and 31.5 mm or less.

The fine aggregate is preferably a fine aggregate having a particle diameter of 0.075 mm or more and less than 2.36 mm. Examples of the fine aggregate include river sand, hill sand, mountain sand, sea sand, crushed sand, fine sand, screenings, crushed stone dust, silica sand, artificial sand, glass cullet, molding sand, and recycled aggregate-crushed sand.

The aforementioned particle diameter is a value prescribed in JIS 5001:1995.

Among them, a combination of the coarse aggregate and the fine aggregate is preferred.

The fine aggregate may contain a filler having a particle diameter of less than 0.075 mm (for example, sand). Examples of the filler include sand, fly ash, calcium carbonate, and slaked lime. Among them, from the viewpoint of enhancing the dry strength, calcium carbonate is preferred.

From the viewpoint of enhancing the dry strength, the average particle diameter of the filler is preferably 0.001 mm or more, and preferably 0.05 mm or less, more preferably 0.03 mm or less, further preferably 0.02 mm or less. The average particle diameter of the filler can be measured by a laser diffraction particle size distribution analyzer. Here, the average particle diameter means an average particle diameter of 50% cumulative volume.

[Method of Measuring Average Particle Diameter of Filler]

The average particle diameter of the filler is a value measured using a laser diffraction particle size distribution analyzer (LA-950, manufactured by HORIBA, Ltd.) under the following conditions.

Measurement method: flow method
Dispersion medium: ethanol
Sample preparation: 2 mg/100 mL
Dispersing method: stirring, 1 minute under built-in ultrasonic waves From the viewpoint of the reduction in the amount of microplastics, a mass ratio of the coarse aggregate to the fine aggregate is preferably 10/90 or more, more preferably 20/80 or more, further preferably 30/70 or more, and preferably 90/10 or less, more preferably 80/20 or less, further preferably 70/30 or less.

From the viewpoint of reducing the amount of microplastics generated, the content of the aggregate is preferably 1,000 parts by mass or more, more preferably 1,200 parts by mass or more, further preferably 1,400 parts by mass or more, and preferably 3,000 parts by mass or less, more preferably 2,500 parts by mass or less, and further preferably 2,000 parts by mass or less, relative to 100 parts by mass of the asphalt composition.

Suitable examples of blending in the asphalt mixture are as follows.

(1) An example of the asphalt mixture contains, for example, 30% by volume or more and less than 45% by volume of the coarse aggregate, 30% by volume or more and 50% by volume or less of the fine aggregate, and 5% by volume or more and 10% by volume or less of the asphalt composition (fine-graded asphalt).

(2) An example of the asphalt mixture contains, for example, 45% by volume or more and less than 70% by volume of the coarse aggregate, 20% by volume or more and 45% by volume or less of the fine aggregate, and 3% by volume or more and 10% by volume or less of the asphalt composition (dense-graded asphalt).

(3) An example of the asphalt mixture contains, for example, 70% by volume or more and 80% by volume or less of the coarse aggregate, 10% by volume or more and 20% by volume or less of the fine aggregate, and 3% by volume or more and 10% by volume or less of the asphalt composition (porous asphalt).

In the asphalt mixture, other components may be further blended, as the need arises.

In a conventional asphalt mixture containing an aggregate and an asphalt, a blending proportion of the asphalt is generally adopted according to an optimum asphalt amount obtained from "Formulation and Design of Asphalt Composition" as described in "Guideline for Pavement Design and Construction" published by Japan Road Association.

In the present invention, the aforementioned optimum asphalt amount corresponds to the total amount of the asphalt, the thermoplastic elastomer, and the polyester. Accordingly, in general, the aforementioned optimum asphalt amount is preferably adopted as the total amount of the asphalt, the thermoplastic elastomer, and the polyester blended.

However, the method of determining the amount is not to be limited to the method as described in "Guideline for Pavement Design and Construction", and the amount may also be determined by any other method.

[Method of Producing Asphalt Mixture]

The method of producing an asphalt mixture of the present invention includes a step of subjecting a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less to transesterification in the presence of an alcohol and a carboxylic acid compound for 4 hours or more under a condition of 180° C. or higher and 235° C. or lower to obtain a polyester (Step 1), and a step of mixing a heated aggregate, an asphalt, and the polyester (the polyester obtained in Step 1) (Step 2), and preferably includes a step of mixing a heated aggregate, an asphalt, a thermoplastic elastomer, and the polyester.

In the method of producing an asphalt mixture of the present invention, the polyethylene terephthalate is preferably a recovered polyethylene terephthalate. In this case, the method of producing an asphalt mixture includes a step of recovering a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less from a product (Step 1a), Step 2a: a step of subjecting the polyethylene terephthalate (the polyethylene terephthalate obtained in the Step 1a) to transesterification in the presence of an alcohol and a carboxylic acid compound for 4 hours or more under a condition of 180° C. or higher and 235° C. or lower to obtain a polyester (Step 2a), and a step of mixing an asphalt with the polyester (the polyester obtained in the Step 2a) (Step 3a).

Specific examples of a method of producing an asphalt mixture include conventional methods of producing an asphalt mixture called a plant mix method, a premix method, and the like. The methods are all a method in which an asphalt (and a thermoplastic elastomer as needed) and a polyester are added to a heated aggregate. Examples of the addition method include a premix method in which an asphalt (and a thermoplastic elastomer as needed) and a polyester are previously dissolved; and a plant mix method in which a modified asphalt having a thermoplastic elastomer dissolved in an asphalt is added, and then, a polyester is put therein. Among them, the premix method is preferred from the viewpoint of reducing the amount of microplastics generated.

More specifically, in the mixing step of the method of producing an asphalt mixture, preferably (i) the asphalt (and the thermoplastic elastomer as needed) are added to and mixed with the heated aggregate, and then, the polyester is added and mixed;

(ii) the asphalt (and the thermoplastic elastomer as needed) and the polyester are simultaneously added to and mixed with the heated aggregate; or (iii) a mixture of the asphalt (and the thermoplastic elastomer as needed) and the polyester previously mixed with heat is added to and mixed with the heated aggregate.

Among them, a method of (iii) is preferred from the viewpoint of reducing the amount of microplastics generated.

The temperature in previously mixing the asphalt and the polyester in the method of (iii) is, from the viewpoint of reducing the amount of microplastics generated, preferably a temperature higher than the softening point of the polyester, preferably 130° C. or higher, more preferably 150° C. or higher, further preferably 170° C. or higher, furthermore preferably 180° C. or higher, and from the viewpoint of preventing thermal degradation of the asphalt, preferably 230° C. or lower, more preferably 210° C. or lower, further preferably 200° C. or lower. The time of mixing is, for example, 10 minutes or more, preferably 30 minutes or more, more preferably 1 hour or more, more preferably 2 hours or more. The upper limit of the time is not particularly limited, and, for example, is about 5 hours.

The temperature of the heated aggregate in the methods of (i) to (iii) is, from the viewpoint of reducing the amount of microplastics generated, a temperature higher than the softening point of the polyester, preferably 130° C. or higher, more preferably 150° C. or higher, further preferably 170° C. or higher, furthermore preferably 180° C. or higher, and from the viewpoint of preventing thermal decomposition of the asphalt, preferably 230° C. or lower, more preferably 210° C. or lower, further preferably 200° C. or lower.

In the step of mixing, from the viewpoint of reducing the amount of microplastics generated, the temperature of mixing is preferably a temperature higher than the softening point of the polyester, preferably 130° C. or higher, more preferably 150° C. or higher, further preferably 170° C. or higher, furthermore preferably 180° C. or higher, and from the viewpoint of preventing thermal decomposition of the asphalt, preferably 230° C. or lower, more preferably 210° C. or lower, further preferably 200° C. or lower. The time of mixing in the step of mixing is, for example, 30 seconds or more, preferably 1 minute or more, more preferably 2 minutes or more, further preferably 5 minutes or more. The upper limit of the time is not particularly limited, and, for example, is about 30 minutes.

From the viewpoint of the reduction in the amount of microplastics, the method of producing an asphalt mixture preferably includes, after the step of mixing, a step of keeping the obtained mixture at a temperature higher than the softening point of the polyester or higher.

In the step of keeping, the mixture may be further mixed as long as the above-mentioned temperature or higher is kept.

In the step of keeping, the temperature of mixing is preferably a temperature higher than the softening point of the polyester, preferably 130° C. or higher, more preferably 150° C. or higher, further preferably 170° C. or higher, furthermore preferably 180° C. or higher, and from the viewpoint of preventing thermal decomposition of the asphalt composition, is preferably 230° C. or lower, more preferably 210° C. or lower, further preferably 200° C. or lower. The time of keeping in the step of keeping is preferably 0.5 hours or more, more preferably 1 hour or more, further preferably 1.5 hours or more. The upper limit of the time is not particularly limited, and is, for example, about 5 hours.

[Road Pavement Method]

The asphalt mixture of the present invention is suitable for paving a road, and as described above, an asphalt mixture in which an aggregate is added to the asphalt composition is used for paving a road.

The method of paving a road preferably includes laying the asphalt mixture on a road to form an asphalt pavement material layer. Specifically, the method of paving a road includes a step of mixing an asphalt, the polyester, and an aggregate to obtain an asphalt mixture (Step 1), and a step of laying the asphalt mixture obtained in the Step 1 on a road to form an asphalt pavement material layer (Step 2). The asphalt pavement material layer is preferably a base course or a surface course.

The asphalt mixture may be subjected to compaction laying by such a method using a known laying machine. In the case of using a heated asphalt mixture, from the viewpoint of the reduction in the amount of microplastics, a compaction temperature thereof is preferably a temperature higher than the softening point of the polyester, preferably 100° C. or higher, more preferably 120° C. or higher, further preferably 130° C. or higher, and preferably 200° C. or lower, more preferably 180° C. or lower.

The present invention further discloses the following <1> to <8>.

<1> An asphalt composition containing an asphalt and a polyester,
the polyester being a polycondensate of a polyethylene terephthalate, an alcohol, and a carboxylic acid compound,
the polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less.

<2> The asphalt composition according to the above <1>, wherein the value of [(a quantity of heat absorbed in a DSC measurement)−(a quantity of heat generated in a DSC measurement)] of the polyethylene terephthalate is 10 J/g or more and 30 J/g or less and the intrinsic viscosity (IV) of the polyethylene terephthalate is 0.6 or more and 1.05 or less.

<3> The asphalt composition according to the above <1>, wherein the value of [(a quantity of heat absorbed in a DSC measurement)−(a quantity of heat generated in a DSC measurement)] of the polyethylene terephthalate is 12 J/g or more and 30 J/g or less and the intrinsic viscosity (IV) of the polyethylene terephthalate is 0.6 or more and 1.05 or less.

<4> The asphalt composition according to the above <1>, wherein the value of [(a quantity of heat absorbed in a DSC measurement)−(a quantity of heat generated in a DSC measurement)] of the polyethylene terephthalate is 5 J/g or more and 30 J/g or less and the intrinsic viscosity (IV) of the polyethylene terephthalate is 0.6 or more and 1.05 or less, and the polyester has a number average molecular weight (Mn) of 1,600 or more and 5,000 or less.

<5> The asphalt composition according to the above <1>, wherein the value of [(a quantity of heat absorbed in a DSC measurement)−(a quantity of heat generated in a DSC measurement)] of the polyethylene terephthalate is 5 J/g or more and 30 J/g or less, the intrinsic viscosity (IV) of the polyethylene terephthalate is 0.6 or more and 1.05 or less, and the number average molecular weight (Mn) of the polyester is 2,000 or more and 5,000 or less.

<6> The asphalt composition according to the above <1>, wherein the value of [(a quantity of heat absorbed in a DSC measurement)−(a quantity of heat generated in a DSC measurement)] of the polyethylene terephthalate is 5 J/g or more and 30 J/g or less, the intrinsic viscosity (IV) of the polyethylene terephthalate is 0.6 or more and 1.05 or less, and the number average molecular weight (Mn) of the polyester is 1,600 or more and 4,000 or less.

<7> The asphalt composition according to the above <1>, wherein the value of [(a quantity of heat absorbed in a DSC measurement)−(a quantity of heat generated in a DSC measurement)] of the polyethylene terephthalate is 10 J/g or more and 30 J/g or less, the intrinsic viscosity (IV) of the polyethylene terephthalate is 0.6 or more and 1.05 or less, and the number average molecular weight (Mn) of the polyester is 2,000 or more and 5,000 or less.

<8> The asphalt composition according to the above <1>, wherein the value of [(a quantity of heat absorbed in a DSC measurement)−(a quantity of heat generated in a DSC measurement)] of the polyethylene terephthalate is 10 J/g or more and 30 J/g or less, the intrinsic viscosity (IV) of the polyethylene terephthalate is 0.6 or more and 1.05 or less, and the number average molecular weight (Mn) of the polyester is 2,000 or more and 4,000 or less.

<9> The asphalt composition according to any one of the above <1> to <8>, wherein the intrinsic viscosity (IV) of the polyethylene terephthalate is more than 0.6.

<10> The asphalt composition according to any one of the above <1> to <8>, wherein the intrinsic viscosity (IV) of the polyethylene terephthalate is 0.61 or more.

<11> The asphalt composition according to any one of the above <1> to <8>, wherein the intrinsic viscosity (IV) of the polyethylene terephthalate is 0.62 or more.

<12> The asphalt composition according to any one of the above <1> to <8>, wherein the intrinsic viscosity (IV) of the polyethylene terephthalate is 0.63 or more.

<14> The asphalt composition according to any one of the above <1> to <8>, wherein the intrinsic viscosity (IV) of the polyethylene terephthalate is 0.4 or more.

<15> An asphalt composition containing an asphalt and a polyester, the polyester being a polycondensate of a polyethylene terephthalate, an alcohol, and a carboxylic acid compound, the polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.7 or more and 1.05 or less.

<16> A method of producing an asphalt mixture, the method including
Step 1: a step of subjecting a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less to transesterification in the presence of an alcohol and a carboxylic acid compound for 4 hours or more in a condition of 180° C. or higher and 210° C. or lower to obtain a polyester, and
Step 2: a step of mixing a heated aggregate, an asphalt, and the polyester obtained in the Step 1.

<17> A method of producing a polyester, the method including subjecting a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less to transesterification in the presence of an alcohol and a carboxylic acid compound for 4 hours under a condition of 180° C. or higher and 210° C. or lower.

EXAMPLES

Property values of resins and the like were measured and evaluated by the following methods.

[Measurement Methods]

[Intrinsic Viscosity (IV) of PET]

The intrinsic viscosity (IV) of a PET was determined by dissolving the PET in a mixed solvent of phenol/tetrachloroethane of 60/40 (mass ratio) at a concentration of 0.4 g/dL, performing a measurement with an Ubbelohde viscometer, and calculating the IV according to the following formula.

$$IV=(\sqrt{(1+4k\eta)}-1)/(2kC) \qquad [\text{Math. 1}]$$

[In the formula, k is the Huggins constant, C is the concentration (g/dL) of the sample solution, $\eta=(t1/t0)-1$, t0 is the dropping time in seconds of only the solvent, and t1 is the dropping time in seconds of the sample solution. 0.33 is adopted as k.]

[Quantity of Heat Absorbed and Quantity of Heat Generated in DSC Measurement of PET]

Using a differential scanning calorimeter "Q-100" (manufactured by TA Instruments Japan, Inc.), 0.01 to 0.02 g of a sample was weighed into an aluminum pan and was heated to 300° C. at a temperature rise rate of 10° C./minutes. A base line was drawn in a region of an endothermic behavior including the maximum endothermic peak temperature and the area was taken as the quantity of heat absorbed. A base line was drawn in a region of an exothermic behavior including the maximum exothermic peak temperature and the area was taken as the quantity of heat generated.

[Acid Value and Hydroxyl Value of Polyester]

An acid value and a hydroxyl value of a polyester were each measured on the basis of the method of JIS K0070: 1992. However, only the measuring solvent was changed from the mixed solvent of ethanol and ether as prescribed in JIS K0070:1992 to a mixed solvent of acetone and toluene (acetone/toluene=1/1 (volume ratio)).

[Softening Point and Glass Transition Point of Polyester]

(1) Softening Point

Using a flow tester "CFT-500D" (manufactured by Shimadzu Corporation), while heating 1 g of a sample at a temperature rise rate of 6° C./min, a load of 1.96 MPa was applied with a plunger, and the sample was extruded through a nozzle having a diameter of 1 mm and a length of 1 mm. The amount of descent of the plunger of the flow tester versus the temperature was plotted, and a temperature at which a half amount of the sample flowed out was taken as the softening point of the sample.

(2) Glass Transition Point

Using a differential scanning calorimeter "Q-100" (manufactured by TA Instruments Japan Inc.), 0.01 to 0.02 g of a sample was weighed in an aluminum pan, the sample was heated to 200° C., and then was cooled from that temperature to 0° C. at a temperature drop rate of 10° C./min. Subsequently, the measurement was performed while raising the temperature to 150° C. at a temperature rise rate of 10° C./min. A temperature at which an extension of a baseline in a region of the maximum endothermic peak temperature or lower was intersected with a tangential line having a maximum inclination of the curve in a region of from a rise-up portion of the peak to an apex of the peak was read as the glass transition point of the sample.

[Number Average Molecular Weight (Mn) and Weight Average Molecular Weight (Mw) of Resin]

According to the following method, the number average molecular weight and weight average molecular weight were determined by gel permeation chromatography (GPC).

(1) Preparation of Sample Solution

A sample was dissolved in tetrahydrofuran at 40° C. at a concentration of 0.5 g/100 mL. Next, the solution was filtered through a PTFE-type membrane filter "DISMIC-25JP" having a pore size of 0.20 μm (manufactured by Toyo Roshi Kaisha, Ltd.) to remove insoluble components, thereby preparing a sample solution.

(2) Measurement of Molecular Weight

Using a measurement apparatus and an analytical column described below, tetrahydrofuran as an eluent was allowed to flow at a flow rate of 1 mL/minute and the column was stabilized in a thermostatic chamber at 40° C. 100 μL of the sample solution is injected thereto to perform a measurement. The molecular weight of the sample was calculated based on a calibration curve created in advance. As the calibration curve here, one created by using several monodispersed polystyrenes (A-500 ($5.0 \times 10^2$), A-1000 ($1.01 \times 10^3$), A-2500 ($2.63 \times 10^3$), A-5000 ($5.97 \times 10^3$), F-1

(1.02×10$^4$), F-2 (1.81×10$^4$), F-4 (3.97×10$^4$), F-10 (9.64×10$^4$), F-20 (1.90×10$^5$), F-40 (4.27×10$^5$), F-80 (7.06×10$^5$), and F-128 (1.09×10$^6$) manufactured by Tosoh Corporation) as standard samples was used. Values in the parenthesis indicate the molecular weights.
Measurement apparatus: "HLC-8220GPC" (manufactured by Tosoh Corporation) Analytical column: "TSKgel GMHXL"+"TSKgel G3000HXL" (manufactured by Tosoh Corporation)
[Content of Components Having Molecular Weight of 500 or Less in Polyester]
According to the following method, the proportion (% by mass) of components having a molecular weight of 500 or less was determined by a GPC method.
(1) Preparation of a sample solution and measurement were performed in the same manner as in the measurement of the number average molecular weight and weight average molecular weight of a polyester.
(2) Method of Calculation
Peaks in a chart obtained by the method were cut with a straight line at a keeping time showing a molecular weight calculated by the calibration curve created with the standard substances of 500, and the area of peaks on the smaller molecular weight side was divided by the total area of the peaks. The resulting value was taken as the proportion (% by mass) of components having a molecular weight of 500 or less.
[PET]
(PET-1)
As PET-1, the PET-c described in JP 2004-163808 A was used as it was without melt-kneading, for synthesizing a polyester.
(PET-2)
100 parts by mass of PET-1 was melt-kneaded using a co-rotation twin screw extruder having a whole length of a kneading part of 1560 mm, a screw diameter of 42 mm, a barrel inner diameter of 43 mm at a roll rotating speed of 200 rpm and at a heating temperature in the roll of 280° C. to obtain a melt-kneaded product of PET-1. The rate of feed of the PET-1 was 10 kg/h and the average retention time thereof was about 18 seconds.
The obtained melt-kneaded product was cooled by using a cooling roller of a water temperature of 20° C. and then was roughly pulverized to obtain PET-2.

(PET-2A)
A melt kneaded product of PET-1 was obtained in the same manner as in preparation of PET-2.
The obtained melt-kneaded product was immediately cooled by using a cooling roller of a water temperature of 5° C. and then was roughly pulverized to obtain PET-2A.
(PET-2B)
A melt kneaded product of PET-1 was obtained in the same manner as in preparation of PET-2.
The obtained melt-kneaded product was cooled by using a roller of a water temperature of 35° C. and then was roughly pulverized to obtain PET-2B.
(PET-3)
"RAMAPET N2G" (manufactured by Indorama Ventures) was used as PET-3 and was used as it was without melt-kneading, for synthesizing a polyester.
(PET-4)
A melt-kneaded product of PET-3 was obtained in the same manner as in preparation of PET-2 except for changing PET-1 to PET-3.
The obtained melt-kneaded product was immediately cooled by using a cooling roller of a water temperature of 5° C. and then was roughly pulverized to obtain PET-4.
(PET-5)
A melt-kneaded product was obtained in the same manner as in preparation of PET-2 except for changing PET-1 to "TRN-MTJ" (manufactured by TEIJIN LIMITED).
The obtained melt-kneaded product was immediately cooled by using a cooling roller of a water temperature of 5° C. and then was roughly pulverized to obtain PET-5.
(PET-6)
"SA-1206" (manufactured by UNITIKA LTD.) was used as PET-6.
(PET-7)
A melt-kneaded product was obtained in the same manner as in preparation of PET-2 except for changing PET-1 to PET-6.
The obtained melt-kneaded product was cooled by using a cooling roller of a water temperature of 20° C. and then was roughly pulverized to obtain PET-7.
(PET-8)
"Recycle Pellet Polyester Chip White" (manufactured by Polindo UTAMA) was used as PET-8 as it was without melt-kneading, for synthesizing a polyester.

TABLE 1

| | PET | Details | Quantity of heat absorbed − Quantity of heat generated (J/g) | Intrinsic viscosity (IV) (—) |
|---|---|---|---|---|
| Comparative Example | PET-1 | PET (*1) | 45 | 1.00 |
| Example | PET-2 | PET-1 was melt-kneaded and then cooled at 20° C. | 15 | 1.00 |
| Example | PET-3 | RAMAPET N2G (*2) | 16 | 0.75 |
| Comparative Example | PET-4 | PET-3 was melt-kneaded and then cooled at 5° C. | 3 | 0.75 |
| Example | PET-2A | PET-1 was melt-kneaded and then cooled at 5° C. | 8 | 1.00 |
| Example | PET-2B | PET-1 was melt-kneaded and then cooled at 35° C. | 28 | 1.00 |
| Comparative Example | PET-5 | TRN-MTJ (*3) was melt-kneaded and then cooled at 5° C. | 11 | 0.53 |
| | PET-6 | SA-1206 (*4) | 58 | 1.07 |
| Comparative Example | PET-7 | PET6 was melt-kneaded and then cooled at 20° C. | 22 | 1.07 |
| Example | PET-8 | Recycle Pellet Polyester Chip White (*5) | 14 | 0.65 |

*1: The same PET as PET-c used in JP 2004-163808 A
*2: "RAMAPET N2G" (manufactured by Indorama Ventures)
*3: "TRN-MTJ" (manufactured by TEIJIN LIMITED)
*4: "SA-1206" (manufactured by UNITIKA LTD.)
*5: "Recycle Pellet Polyester Chip White" (manufactured by Polindo UTAMA)

Production Examples 1 to 10

(Polyesters (A1) to (A10) and (A12))

Raw materials shown in Tables 2 and 3 other than adipic acid were put in a 5-liter four-neck flask equipped with a nitrogen introducing tube, a dewatering conduit with a branching tube through which a 100° C. hot water flowed, a stirrer, and a thermocouple, 20 g of tin(II) di(2-ethylhexanoate) and 2 g of gallic acid were added in nitrogen atmosphere, and the temperature was heated to 180° C. After keeping the resultant at 180° C. for 1 hour, the temperature was increased from 180° C. to 210° C. at 10° C./hour. Then a polycondensation reaction was performed at 210° C. for 7 hours, and a reaction was further continued at 210° C. and 8.0 kPa for 1 hour. Next, adipic acid was added and a reaction was continued at 210° C. and 10 kPa until the softening point shown in Tables 2 and 3 was reached, thereby obtaining amorphous polyesters (A1) to (A10) and (A12).

Production Example 11

(Polyester (A11))

Raw materials shown in Table 3 other than adipic acid were put in a 5-liter four-neck flask equipped with a thermometer, a stainless-steel stirrer bar, a flow-down condenser, and a nitrogen introducing tube, and 20 g of tin(II) di(2-ethylhexanoate) and 2 g of gallic acid were added in nitrogen atmosphere, and the temperature was increased to 235° C. in a mantle heater, was then kept at 235° C. for 7 hours, and a reaction at a reduced pressure was performed at 8.0 kPa for 1 hour. Then, after cooling the resultant to 180° C., adipic acid was added thereto, the temperature was increased to 210° C. over 2 hours and was kept at 210° C. for 1 hour, and while performing a reaction at reduced pressure, a reaction was continued until the softening point shown in Table 3 was reached, thereby obtaining a polyester (A11).

TABLE 2

|  |  |  | Production Example | | | | | |
|---|---|---|---|---|---|---|---|---|
|  |  |  | 1 | | 2 | | 3 | |
|  |  |  | | | Resin | | | |
|  |  |  | A1 | | A2 | | A3 | |
| Raw material monomers |  |  | Charged amount (g) | Molar ratio | Charged amount (g) | Molar ratio | Charged amount (g) | Molar ratio |
|  | Alcohol component | BPA-PO *1 | — | — | — | — | — | — |
|  |  | BPA-EO *2 | — | — | — | — | — | — |
|  |  | 1,2-PG *3 | 1216 | 80 | 912 | 60 | 1368 | 90 |
|  | Carboxylic acid components | Terephthalic acid | 1992 | 60 | 1328 | 40 | 2324 | 70 |
|  |  | Adipic acid | 438 | 1.5 | 438 | 15 | 438 | 15 |
|  |  | Used PET*3 | | | | | | |
| Example | PET | PET-2 | 768 | 20 | 1536 | 40 | 384 | 10 |
|  |  | PET-3 | — | — | — | — | — | — |
|  |  | PET-2A | — | — | — | — | — | — |
|  |  | PET-2B | — | — | — | — | — | — |
| Comparative Example |  | PET-1 | — | — | — | — | — | — |
|  |  | PET-4 | — | — | — | — | — | — |
|  |  | PET-5 | — | — | — | — | — | — |
|  |  | PET-7 | — | — | — | — | — | — |
|  |  | PET-8 | — | — | — | — | — | — |
|  | Molar ratio of PET (%) |  | 19.8 | | 40.2 | | 9.8 | |
| Esterification catalyst | Tin (II) di(2-ethylhexanoate) |  | 20 g | | 20 g | | 20 g | |
| Promoter | Gallic acid |  | 2 g | | 2 g | | 2 g | |
| Properties | Softening point (° C.) |  | 101.5 | | 98.7 | | 100.2 | |
|  | Glass transition point (° C.) |  | 56.7 | | 57.4 | | 55.4 | |
|  | Acid value (mgKOH/g) |  | 13.4 | | 12.6 | | 16.4 | |
|  | Hydroxyl value (mgKOH/g) |  | 22.1 | | 21.4 | | 23.4 | |
|  | Number average molecular weight Mn |  | 3000 | | 3500 | | 2800 | |
|  | Weight average molecular weight Mw |  | 7800 | | 8700 | | 6500 | |
|  | Mw/Mn |  | 2.60 | | 2.49 | | 2.32 | |
|  | Components of molecular weight <500 (% by mass) |  | 3.5 | | 3.9 | | 4.2 | |

|  |  |  | Production Example | | | | | |
|---|---|---|---|---|---|---|---|---|
|  |  |  | 4 | | 5 | | 6 | |
|  |  |  | | | Resin | | | |
|  |  |  | A4 | | A5 | | A6 | |
| Raw material monomers |  |  | Charged amount (g) | Molar ratio | Charged amount (g) | Molar ratio | Charged amount (g) | Molar ratio |
|  | Alcohol component | BPA-PO *1 | — | — | — | — | — | — |
|  |  | BPA-EO *2 | — | — | — | — | — | — |
|  |  | 1,2-PG *3 | 1216 | 80 | 1216 | 80 | 1216 | 80 |
|  | Carboxylic acid components | Terephthalic acid | 1992 | 60 | 1992 | 60 | 1992 | 60 |
|  |  | Adipic acid | 438 | 15 | 438 | 15 | 438 | 15 |

TABLE 2-continued

|  |  |  |  |  |  |  |  |  |
|---|---|---|---|---|---|---|---|---|
| Example | PET | PET-2 | — | — | — | — | — | — |
|  |  | PET-3 | 768 | 20 | — | — | — | — |
|  |  | PET-2A | — | — | 768 | 20 | — | — |
|  |  | PET-2B | — | — | — | — | 768 | 20 |
| Comparative | | PET-1 | — | — | — | — | — | — |
| Example | | PET-4 | — | — | — | — | — | — |
|  |  | PET-5 | — | — | — | — | — | — |
|  |  | PET-7 | — | — | — | — | — | — |
|  |  | PET-8 | — | — | — | — | — | — |
|  | Molar ratio of PET (%) | | 19.8 | | 19.8 | | 19.8 | |
| Esterification catalyst | Tin (II) di(2-ethylhexanoate) | | 20 g | | 20 g | | 20 g | |
| Promoter | Gallic acid | | 2 g | | 2 g | | 2 g | |
| Properties | Softening point (° C.) | | 102.4 | | 103.0 | | 100.9 | |
|  | Glass transition point (° C.) | | 57.6 | | 57.2 | | 55.7 | |
|  | Acid value (mgKOH/g) | | 12.4 | | 12.4 | | 14.6 | |
|  | Hydroxyl value (mgKOH/g) | | 20.9 | | 21.1 | | 23.6 | |
|  | Number average molecular weight Mn | | 3300 | | 3300 | | 2800 | |
|  | Weight average molecular weight Mw | | 8200 | | 9000 | | 7200 | |
|  | Mw/Mn | | 2.48 | | 2.73 | | 2.57 | |
|  | Components of molecular weight <500 (% by mass) | | 3.1 | | 3.4 | | 3.6 | |

*1: BPA-PO: polyoxypropylene (2.2 mol) adduct of bisphenol A
*2: BPA-EO: polyoxyethylene (2.2 mole) adduct of bisphenol A
*3: Calculated with (terephthalic acid – ethylene glycol) unit taken as 1 mole
*4: 1,2-PG: 1,2-propnanediol

TABLE 3

|  |  |  | Production Example | | | | | |
|---|---|---|---|---|---|---|---|---|
|  |  |  | 7 | | 8 | | 9 | |
|  |  |  | Resin | | | | | |
|  |  |  | A7 | | A8 | | A9 | |
| Raw material monomers |  |  | Charged amount (g) | Molar ratio | Charged amount (g) | Molar ratio | Charged amount (g) | Molar ratio |
|  | Alcohol component | BPA PO *1 | — | — | — | — | — | — |
|  |  | BPA-EO *2 | — | — | — | — | — | — |
|  |  | 1,2-PG *3 | 1216 | 80 | 1216 | 80 | 1216 | 80 |
|  | Carboxylic acid components | Terephthalic acid | 1992 | 60 | 1992 | 60 | 1992 | 60 |
|  |  | Adipic acid | 438 | 15 | 438 | 15 | 438 | 15 |
|  | Used PET*3 | | | | | | | |
| Example | PET | PET-2 | — | — | — | — | — | — |
|  |  | PET-3 | — | — | — | — | — | — |
|  |  | PET-2A | — | — | — | — | — | — |
|  |  | PET-2B | — | — | — | — | — | — |
| Comparative | | PET-1 | 768 | 20 | — | — | — | — |
| Example | | PET-4 | — | — | 768 | 20 | — | — |
|  |  | PET-5 | — | — | — | — | 768 | 20 |
|  |  | PET-7 | — | — | — | — | — | — |
|  |  | PET-8 | — | — | — | — | — | — |
|  | Molar ratio of PET (%) | | 19.8 | | 19.8 | | 19.8 | |
| Esterification catalyst | Tin(II) di(2-ethylhexanoate) | | 20 g | | 20 g | | 20 g | |
| Promoter | Gallic acid | | 2 g | | 2 g | | 2 g | |
| Properties | Softening point (° C.) | | 99.8 | | 102.6 | | 98.9 | |
|  | Glass transition point (° C.) | | 54.5 | | 55.8 | | 56.8 | |
|  | Acid value (mgKOH/g) | | 15.1 | | 14.0 | | 14.3 | |
|  | Hydroxyl value (mgKOH/g) | | 23.6 | | 19.6 | | 19.6 | |
|  | Number average molecular weight Mn | | 3200 | | 3400 | | 2800 | |
|  | Weight average molecular weight Mw | | 7400 | | 8100 | | 7400 | |
|  | Mw/Mn | | 2.31 | | 2.38 | | 2.64 | |
|  | Components of molecular weight <500 (% by mass) | | 4.1 | | 3.2 | | 3.3 | |

TABLE 3-continued

| | | | Production Example | | | | | |
|---|---|---|---|---|---|---|---|---|
| | | | 10 | | 11 | | 12 | |
| | | | | | Resin | | | |
| | | | A10 | | A11 | | A12 | |
| | | | Charged amount (g) | Molar ratio | Charged amount (g) | Molar ratio | Charged amount (g) | Molar ratio |
| Raw material monomers | Alcohol component | BPA PO *1 | — | — | 2100 | 60 | — | — |
| | | BPA-EO *2 | — | — | 650 | 20 | — | — |
| | | 1,2-PG *3 | 1216 | 80 | — | — | 1216 | 80 |
| | Carboxylic acid components | Terephthalic acid | 1992 | 60 | 996 | 60 | 1992 | 60 |
| | | Adipic acid | 438 | 15 | 219 | 15 | 438 | 15 |
| | | Used PET*3 | | | | | | |
| Example | PET | PET-2 | — | — | 384 | 20 | — | — |
| | | PET-3 | — | — | — | — | — | — |
| | | PET-2A | — | — | — | — | — | — |
| | | PET-2B | — | — | — | — | — | — |
| Comparative Example | | PET-1 | — | — | — | — | — | — |
| | | PET-4 | — | — | — | — | — | — |
| | | PET-5 | — | — | — | — | — | — |
| | | PET-7 | 768 | 20 | — | — | — | — |
| | | PET-8 | 768 | 20 | — | — | 768 | 20 |
| | Molar ratio of PET (%) | | 19.8 | | 9.4 | | 19.8 | |
| Esterification catalyst | Tin(II) di(2-ethylhexanoate) | | 20 g | | 20 g | | 20 g | |
| Promoter | Gallic acid | | 2 g | | 2 g | | 2 g | |
| Properties | Softening point (° C.) | | 103.6 | | 99.4 | | 102.5 | |
| | Glass transition point (° C.) | | 57.6 | | 58.7 | | 57.3 | |
| | Acid value (mgKOH/g) | | 13.7 | | 11.3 | | 12.2 | |
| | Hydroxyl value (mgKOH/g) | | 20.8 | | 21.4 | | 20.7 | |
| | Number average molecular weight Mn | | 3600 | | 2900 | | 3300 | |
| | Weight average molecular weight Mw | | 9400 | | 10200 | | 8400 | |
| | Mw/Mn | | 2.61 | | 3.52 | | 2.55 | |
| | Components of molecular weight <500 (% by mass) | | 4.2 | | 3.2 | | 3.0 | |

*1: BPA-PO polyoxypropylene (2.2 mol) adduct of bisphenol A
*2: BPA-EO: polyoxyethylene (2.2 mol) adduct of bisphenol A
*3: calculated with (terephthalic acid – ethylene glycol) unit taken as 1 mole
*4: 1,2-PG: 1,2-propanediol Production Example 12

(Polyester (B1))

Raw materials of a polyester resin shown in Table 4 other than adipic acid were put in a 5-liter four-neck flask equipped with a thermometer, a stainless-steel stirrer bar, a flow-down condenser, and a nitrogen introducing tube, and the temperature was increased to 160° C. in nitrogen atmosphere. Then, a mixture of acrylic acid (bireactive monomer), a raw material monomer of a vinyl resin, and a polymerization initiator was added dropwise with a dropping funnel over 1 hour. After dropwise addition, the addition polymerization reaction was aged for 1 hour while keeping the temperature at 160° C., then the temperature was increased to 200° C., and 20 g of tin(II) 2-ethylhexanoate and 2 g of gallic acid were added. Then, a polycondensation reaction was performed at 230° C. for 6 hours, and a reaction was further continued at 230° C. and 8.0 kPa for 1 hour. After cooling to 210° C., adipic acid was put thereto, and a reaction was continued at 210° C. and 10 kPa until the softening point shown in Table 4 was reached, thereby obtaining a polyester (B1).

TABLE 4

| | | | Production Example 12 Resin B1 | |
|---|---|---|---|---|
| | | | Charged amount (g) | Molar ratio *4 |
| Polyester system raw materials | Alcohol components | BPA-PO *1 | 2100 | 60 |
| | | BPA-EO *2 | 650 | 20 |
| | Carboxylic acid components | Terephthalic acid | 996 | 60 |
| | | Adipic acid | 219 | 15 |
| | Used PET*3 | PET-2 | 384 | 20 |
| | Weight ratio of PET in polyester component (%) | | 9.4 | |
| | Bireactive monomer | Acrylic acid | 43 | 6 |

TABLE 4-continued

|  |  |  | Charged amount (g) | Mass ratio |
|---|---|---|---|---|
| Vinyl system raw materials | Polymerization initiator | Dibutyl peroxide | 58 | 6 |
|  | Raw material monomers of vinyl resin | Styrene | 815 | 84 |
|  |  | 2-Ethylhexyl acrylate | 155 | 16 |
|  | (Vinyl system raw materials)/[polyester + vinyl system raw materials] × 100 (mass %) |  | 20 |  |
| Esterification catalyst | Tin(II) di(2-ethylhexanoate) |  | 20 g |  |
| Promoter | Gallic acid |  | 2 g |  |
| Properties | Softening point (° C.) |  | 101.8 |  |
|  | Glass transition point (° C.) |  | 54.6 |  |
|  | Acid value (mgKOH/g) |  | 13.6 |  |
|  | Hydroxyl value (mgKOH/g) |  | 23.4 |  |
|  | Number average molecular weight Mn |  | 3200 |  |
|  | Weight average molecular weight Mw |  | 10600 |  |
|  | Mw/Mn |  | 3.31 |  |
|  | Components of molecular weight <500 (mass %) |  | 3.4 |  |

*1: BPA-PO: polyoxypropylene (2.2 mol) adduct of bisphenol A
*2: BPA-EO: polyoxyethylene (2.2 mol) adduct of bisphenol A
*3: calculated with (terephthalic acid − ethylene glycol) unit taken as 1 mole
*4: parts by mole of carboxylic acid components of polyester and bireactive monomer relative to 100 parts by mole of alcohol components of raw material monomers of polyester Example 1

As a binder mixture, 2,200 g of a modified asphalt type II (manufactured by TOA ROAD CORPORATION) heated to 180° C. was put in a 3-liter stainless steel container, and was stirred at 100 rpm, and 110 g (5 parts by mass relative to 100 parts by mass of the asphalt) of a polyester (A1) was gradually added thereto and was stirred at 300 rpm for 2 hours, thereby producing an asphalt composition (AS-1).

Next, 11 kg of an aggregate (the composition of the aggregate is described below) heated to 180° C. was put in an asphalt mixer, and the mixture was mixed at 180° C. for 60 seconds.

Next, 635 g of the asphalt composition (AS-1) was added thereto, and the mixture was mixed with an asphalt mixer for 2 minutes. The obtained asphalt mixture was stored at 180° C. for 2 hours, and then was filled in a mold of 300×300×50 mm. With a roller compactor (manufactured by Iwata Kogyosho K. K.), a pressure treatment of 25 rotations was applied at a temperature of 150° C. and a load of 0.44 kPa, thereby producing an asphalt mixture (M-1) as a specimen.
<Composition of Aggregate>
Crushed stones No. 6 50.9 parts by mass
Crushed sand 1 10.4 parts by mass
Crushed sand 2 22.1 parts by mass
Fine sand 10.4 parts by mass
Stone dust 6.2 parts by mass
Passing % by Mass:
Sieve opening 15 mm: 100% by mass
Sieve opening 10 mm: 85.6% by mass
Sieve opening 5 mm: 49.7% by mass
Sieve opening 2.5 mm: 44.6% by mass
Sieve opening 1.2 mm: 31.6% by mass
Sieve opening 0.6 mm: 21.3% by mass
Sieve opening 0.3 mm: 12.7% by mass
Sieve opening 0.15 mm: 7.1% by mass Examples 2 to 7, 12, and 13

Asphalt compositions (AS-2) to (AS-7), (AS-12), and (AS-13) were produced in the same manner as in Example 1 except for changing the polyester (A1) in Example 1 to polyesters (A2) to (A6), (A11), (B1), or (A12), respectively.

Asphalt mixtures (M-2) to (M-7), (M-12), and (M-13) were obtained as a specimen in the same manner as in Example 1 except for changing 635 g of the asphalt composition (AS-1) in Example 1 to 635 g of the asphalt compositions (AS-2) to (AS-7), (AS-12), or (AS-13), respectively.

Example 8

An asphalt composition (AS-8) was obtained in the same manner as in Example 1 except for changing the amount of the polyester (A1) added in Example 1 to 550 g (25 parts by mass relative to 100 parts by mass of the asphalt).

An asphalt mixture (M-8) was obtained as a specimen in the same manner as in Example 1 except for changing 635 g of the asphalt composition (AS-1) in Example 1 to 756 g of the asphalt composition (AS-8).

Example 9

An asphalt composition (AS-9) was obtained in the same manner as in Example 1 except for changing the asphalt in Example 1 to a straight asphalt (manufactured by TOA ROAD CORPORATION).

An asphalt mixture (M-9) was obtained as a specimen in the same manner as in Example 1 except for changing 635 g of the asphalt composition (AS-1) in Example 1 to 635 g of the asphalt composition (AS-9).

Example 10

An asphalt composition (AS-10) was obtained in the same manner as in Example 1 except for changing the asphalt in Example 1 to a modified asphalt "PG76-22" (manufactured by Ergon, Inc. in Texas, US).

An asphalt mixture (M-10) was obtained as a specimen in the same manner as in Example 1 except for changing 635 g of the asphalt composition (AS-1) in Example 1 to 635 g of the asphalt composition (AS-10).

Example 11

An asphalt composition (AS-11) was obtained in the same manner as in Example 1 except for changing the asphalt in Example 1 to a modified asphalt (manufactured by FESPA in Mexico).

An asphalt mixture (M-11) was obtained as a specimen in the same manner as in Example 1 except for changing 635 g of the asphalt composition (AS-1) in Example 1 to 635 g of the asphalt composition (AS-11).

Comparative Example 1

In Example 1, the modified asphalt type II was used as it was without adding the polyester (A1).
An asphalt mixture (M-A) was obtained as a specimen in the same manner as in Example 1 except for changing 635 g of the asphalt composition (AS-1) in Example 1 to 605 g of the modified asphalt type II.

Comparative Examples 2 to 5

Asphalt compositions (AS-a1) to (AS-a4) were produced in the same manner as in Example 1 except for changing the polyester (A1) in Example 1 to the polyesters (A7) to (A10), respectively.
Asphalt mixtures (M-a1) to (M-a4) were obtained as a specimen in the same manner as in Example 1 except for changing 635 g of the asphalt composition (AS-1) in Example 1 to 635 g of the asphalt compositions (AS-a1) to (AS-a4), respectively.

Comparative Example 6

An asphalt composition (AS-a5) was produced in the same manner as in Example 1 except for changing the polyester (A1) in Example 1 to PET 1.
An asphalt mixture (M-a5) was obtained as a specimen in the same manner as in Example 1 except for changing 635 g of the asphalt composition (AS-1) in Example 1 to 635 g of the asphalt composition (AS-a5).

[Evaluation]

<Measurement of Amount of Microplastics>

The specimen was immersed in hot water set at 60° C. in a thermostatic chamber of 60° C., and a test was performed using a wheel tracking tester (manufactured by Iwata Kogyosho K. K.) under conditions of a load of 150 kg, a contact pressure of 0.9 MPa, a water temperature of 60° C., and a speed of 15 rpm, and the test was stopped after 1200 rotations (80 minutes). After water was evacuated from the water tank and the interior thereof was dried, deposited abrasion dust was collected and weighed, and the obtained weight was taken as an "amount of microplastics generated". The obtained value was an amount of microplastics generated per 0.3 m$^2$, and was thus converted to a value per m$^2$.

TABLE 5

| | Asphalt mixture | Amount of aggregate blended (g) | Amount of asphalt composition blended (g) | Asphalt composition | Asphalt | Polyester | PET | Quantity of heat absorbed − quantity of heat generated (J/g) | Intrinsic viscosity (IV) (—) | Polyester content (parts by mass)*1 | Amount of microplastics generated (kg/m$^2$) |
|---|---|---|---|---|---|---|---|---|---|---|---|
| Example1 | M-1 | 11000 | 635 | AS-1 | A | A1 | PET-2 | 15 | 1.00 | 5 | 0.11 |
| Example2 | M-2 | 11000 | 635 | AS-2 | A | A2 | PET-2 | 15 | 1.00 | 5 | 0.18 |
| Example3 | M-3 | 11000 | 635 | AS-3 | A | A3 | PET-2 | 15 | 1.00 | 5 | 0.23 |
| Example4 | M-4 | 11000 | 635 | AS-4 | A | A4 | PET-3 | 16 | 0.75 | 5 | 0.19 |
| Example5 | M-5 | 11000 | 635 | AS-5 | A | A5 | PET-2A | 8 | 1.00 | 5 | 0.21 |
| Example6 | M-6 | 11000 | 635 | AS-6 | A | A6 | PET-2B | 28 | 1.00 | 5 | 0.18 |
| Example7 | M-7 | 11000 | 635 | AS-7 | A | A11 | PET-2 | 15 | 1.00 | 5 | 0.24 |
| Example8 | M-8 | 11000 | 756 | AS-8 | A | A1 | PET-2 | 15 | 1.00 | 25 | 0.15 |
| Example9 | M-9 | 11000 | 635 | AS-9 | B | A1 | PET-2 | 15 | 1.00 | 5 | 0.25 |
| Example10 | M-10 | 11000 | 635 | AS-10 | C | A1 | PET-2 | 15 | 1.00 | 5 | 0.19 |
| Example11 | M-11 | 11000 | 635 | AS-11 | D | A1 | PET-2 | 15 | 1.00 | 5 | 0.23 |
| Example12 | M-12 | 11000 | 635 | AS-12 | A | B1 | PET-2 | 15 | 1.00 | 5 | 0.24 |
| Example13 | M-13 | 11000 | 635 | AS-13 | A | A12 | PET-8 | 14 | 0.65 | 5 | 0.22 |
| Comparative Example1 | M-A | 11000 | 605 | A | A | — | — | — | — | — | 0.82 |
| Comparative Example2 | M-a1 | 11000 | 635 | AS-a1 | A | A7 | PET-1 | 45 | 1.00 | 5 | 0.38 |
| Comparative Example3 | M-a2 | 11000 | 635 | AS-a2 | A | A8 | PET-4 | 3 | 0.75 | 5 | 0.36 |
| Comparative Example4 | M-a3 | 11000 | 635 | AS-a3 | A | A9 | PET-5 | 11 | 0.53 | 5 | 0.41 |
| Comparative Example5 | M-a4 | 11000 | 635 | AS-a4 | A | A10 | PET-7 | 22 | 1.07 | 5 | 0.40 |
| Comparative Example6 | M-a5 | 11000 | 635 | AS-a5 | A | PET-1 | PET-1 | 45 | 1.00 | 5 | 0.84 |

Asphalt A: modified asphalt type II (manufactured by TOA ROAD CORPORATION)
Asphalt B: straight asphalt (TOA ROAD CORPORATION)
Asphalt C: modified asphalt "PG76-22" (manufactured by Ergon in Texas)
Asphalt D: modified asphalt (manufactured by FESPA in Mexico)
*1Polyester content relative to 100 parts by mass of asphalt (parts by mass)

In Comparative Example 6 in which a polyethylene terephthalate was blended as it was, the amount of microplastics generated cannot be sufficiently reduced. In Comparative Examples 2 to 5 in which a structural unit derived from a specific polyethylene terephthalate was not contained, the amount of microplastics generated cannot be sufficiently reduced.

In contrast, it can be seen that, according to the present invention, an asphalt composition that contains a specific polyester containing a structural unit derived from a specific polyethylene terephthalate can significantly reduce, the amount of microplastics generated.

The invention claimed is:

1. A method of producing an asphalt composition, the method comprising:
    subjecting a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less to transesterification in the presence of an alcohol and a carboxylic acid compound for 4 hours or more under a condition of 180° C. or higher and 235° C. or lower to obtain a polyester, and
    mixing an asphalt with the polyester
    wherein an amount of the polyethylene terephthalate present in a raw material for transesterification is 5%-70% by mass based on a total amount of the polyethylene terephthalate, the alcohol, and the carboxylic acid compound being 100% by mass, and
    wherein a molar ratio of a carboxylic acid component-derived structural unit to an alcohol component-derived structural unit [(carboxylic acid component)/(alcohol component)] in the polyester is 1.5 or less.

2. The method of producing an asphalt composition according to claim 1, wherein the polyethylene terephthalate is a recovered polyethylene terephthalate.

3. A method of producing an asphalt mixture, the method comprising:
    subjecting a polyethylene terephthalate having a value of [(a quantity of heat absorbed in a DSC measurement)−(a quantity of heat generated in a DSC measurement)] of 5 J/g or more and 30 J/g or less and having an intrinsic viscosity (IV) of 0.6 or more and 1.05 or less to transesterification in the presence of an alcohol and a carboxylic acid compound for 4 hours or more under a condition of 180° C. or higher and 235° C. or lower to obtain a polyester, and
    mixing a heated aggregate, an asphalt, and the polyester
    wherein an amount of the polyethylene terephthalate present in a raw material for transesterification is 5%-70% by mass based on a total amount of the polyethylene terephthalate, the alcohol, and the carboxylic acid compound being 100% by mass, and
    wherein a molar ratio of a carboxylic acid component-derived structural unit to an alcohol component-derived structural unit [(carboxylic acid component)/(alcohol component)] in the polyester is 1.5 or less.

4. The method of producing an asphalt mixture according to claim 3, wherein:
    (i) the asphalt is added to and mixed with the heated aggregate, and then the polyester is added and mixed,
    (ii) the asphalt and the polyester are simultaneously added to and mixed with the heated aggregate, or
    (iii) a mixture of the asphalt and the polyester mixed with heat in advance is added to and mixed with the heated aggregate.

5. The method of producing an asphalt according to claim 3, wherein the polyethylene terephthalate is a recovered polyethylene terephthalate.

6. The method of producing an asphalt composition according to claim 1, wherein the molar ratio of a carboxylic acid component-derived structural unit to an alcohol component-derived structural unit [(carboxylic acid component)/(alcohol component)] in the polyester is 0.7 or more and 1.5 or less.

7. The method of producing an asphalt composition according to claim 1, wherein the molar ratio of a carboxylic acid component-derived structural unit to an alcohol component-derived structural unit [(carboxylic acid component)/(alcohol component)] in the polyester is 0.8 or more and 1.3 or less.

8. The method of producing an asphalt composition according to claim 1, wherein the molar ratio of a carboxylic acid component-derived structural unit to an alcohol component-derived structural unit [(carboxylic acid component)/(alcohol component)] in the polyester is 0.9 or more and 1.1 or less.

9. The method of producing an asphalt mixture according to claim 3, wherein the molar ratio of a carboxylic acid component-derived structural unit to an alcohol component-derived structural unit [(carboxylic acid component)/(alcohol component)] in the polyester is 0.7 or more and 1.5 or less.

10. The method of producing an asphalt mixture according to claim 3, wherein the molar ratio of a carboxylic acid component-derived structural unit to an alcohol component-derived structural unit [(carboxylic acid component)/(alcohol component)] in the polyester is 0.8 or more and 1.3 or less.

11. The method of producing an asphalt mixture according to claim 3, wherein the molar ratio of a carboxylic acid component-derived structural unit to an alcohol component-derived structural unit [(carboxylic acid component)/(alcohol component)] in the polyester is 0.9 or more and 1.1 or less.

* * * * *